US009889409B2

(12) United States Patent
Park et al.

(10) Patent No.: US 9,889,409 B2
(45) Date of Patent: Feb. 13, 2018

(54) METHOD OF FABRICATING NANOPOROUS ORGANIC-INORGANIC HYBRID FILM AND NANOPOROUS ORGANIC-INORGANIC HYBRID FILM MANUFACTURED BY THE METHOD AND NANOPOROUS MEMBRANE EMPLOYING THE NANOPOROUS ORGANIC-INORGANIC HYBRID FILM

(71) Applicant: GWANGJU INSTITUTE OF SCIENCE AND TECHNOLOGY, Gwangju (KR)

(72) Inventors: Ji-Woong Park, Gwangju (KR); Eun-Kyung Jeon, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 0 days.

(21) Appl. No.: 14/585,778

(22) Filed: Dec. 30, 2014

(65) Prior Publication Data
US 2015/0375175 A1 Dec. 31, 2015

(30) Foreign Application Priority Data
Jun. 27, 2014 (KR) .................. 10-2014-0079528

(51) Int. Cl.
*B01D 67/00* (2006.01)
*C08J 9/00* (2006.01)
(Continued)

(52) U.S. Cl.
CPC ........ *B01D 67/0079* (2013.01); *C08J 9/0066* (2013.01); *C08J 9/286* (2013.01);
(Continued)

(58) Field of Classification Search
CPC .................................. B01D 67/0079
See application file for complete search history.

(56) References Cited

U.S. PATENT DOCUMENTS

| | | | |
|---|---|---|---|
| 2003/0003340 A1* | 1/2003 | Honma | B01D 69/141 429/492 |
| 2010/0019188 A1* | 1/2010 | Warren | C07F 7/1836 252/62.51 R |

(Continued)

FOREIGN PATENT DOCUMENTS

CN 101528599 A 9/2009

OTHER PUBLICATIONS

Wen et al. ("Organic/inorganic hybrid network materials by the sol-gel approach." Chem. Mater. 1996, 8, 1667-1681).*
Moon et al. ("Organic sol-gel synthesis of microporous molecular networks containing spirobifluorene and tetraphenylmethane nodes." J. Polym. Sci., Part A: Polym. Chem. Jan. 28, 2013, 51, 1758-1766).*

(Continued)

*Primary Examiner* — Krishnan S Menon
*Assistant Examiner* — Ryan B Huang
(74) *Attorney, Agent, or Firm* — Hauptman Ham, LLP

(57) ABSTRACT

Disclosed herein is a method of preparing a nanoporous organic-inorganic hybrid film. The method includes preparing an organic sol including a compound having amino groups, a compound having isocyanate groups, and a solvent; adding an inorganic oxide precursor to the organic sol to form a mixed solution; and subjecting the mixed solution to heat treatment to form an organic molecule network structure in which the organic sol is gelled, and an inorganic molecule network structure located along a surface of the organic molecule network structure.

16 Claims, 10 Drawing Sheets

(51) Int. Cl.
*C08J 9/28* (2006.01)
*B01D 71/58* (2006.01)
*B01D 69/06* (2006.01)
*B01D 69/02* (2006.01)
*B01D 69/14* (2006.01)
*B01D 71/02* (2006.01)

(52) U.S. Cl.
CPC .............. *B01D 69/02* (2013.01); *B01D 69/06* (2013.01); *B01D 69/148* (2013.01); *B01D 71/024* (2013.01); *B01D 71/027* (2013.01); *B01D 2325/20* (2013.01); *C08J 2201/0502* (2013.01); *C08J 2201/0522* (2013.01); *C08J 2205/02* (2013.01); *C08J 2205/042* (2013.01); *C08J 2375/02* (2013.01)

(56) References Cited

U.S. PATENT DOCUMENTS

2010/0326273 A1* 12/2010 Liu .................... B01D 67/0079
  95/45
2010/0330353 A1* 12/2010 Kunitake .................. C08J 5/18
  428/220

OTHER PUBLICATIONS

Chinese Office Action dated Mar. 30, 2017 corresponding to Chinese Application No. CN 201410843505.4.

\* cited by examiner

METHOD OF FABRICATING NANOPOROUS ORGANIC-INORGANIC HYBRID FILM AND NANOPOROUS ORGANIC-INORGANIC HYBRID FILM MANUFACTURED BY THE METHOD AND NANOPOROUS MEMBRANE EMPLOYING THE NANOPOROUS ORGANIC-INORGANIC HYBRID FILM

CROSS REFERENCE TO RELATED APPLICATION

This application claims the benefit of Korean Patent Application No. 10-2014-0079528, filed on Jun. 27, 2014, entitled "METHOD OF FABRICATING NANOPOROUS ORGANIC-INORGANIC HYBIRD FILM AND NANOPOROUS ORGANIC-INORGANIC HYBIRD FILM MANUFACTURED BY THE METHOD AND NANOPOROUS MEMBRANE EMPLOYING THE NANOPOROUS ORGANIC-INORGANIC HYBIRD FILM", which is hereby incorporated by reference in its entirety into this application.

BACKGROUND

1. Technical Field

The present invention relates to a nanoporous film, and more particularly, to a method of preparing a nanoporous organic-inorganic hybrid film in which organic materials and inorganic materials are hybridized, a nanoporous organic-inorganic hybrid film prepared by the method, and a nanoporous separator using the nanoporous organic-inorganic hybrid film.

2. Description of the Related Art

Nanoporous materials have recently been developed in various fields and refer to materials having pore properties due to dispersion of meso- or micro-sized small pores. Owing to their structural characteristics or wide surface area properties, nanoporous materials are actively considered for use in new fields, such as environmental materials, new catalysts, tissue engineering, and the like. Such nanoporous materials have been prepared in various ways using organic materials, inorganic materials, or organic-inorganic hybrid materials obtained by mixing organic materials and inorganic materials, and the like.

Thereamong, organic-inorganic hybrid materials refer to composite materials formed from organic materials and inorganic materials having different properties. Organic-inorganic hybrid materials are composite materials formed from organic materials, which have high flexibility, processability, low hardness and heat-sensitive properties, and inorganic materials, which have low flexibility, high hardness, strength and heat resistance, and can impart high functionality by controlling the size of a dispersed phase to nanoscale.

In the related art, various studies have been made on nanoporous films comprised of organic-inorganic hybrid materials for providing conductivity and porosity of inorganic materials through introduction of inorganic particles in a solid phase into a polymer matrix which is an organic material. However, during a process of introducing the inorganic particles having a solid phase into the polymer matrix, crevices generated at interfaces between the polymer matrix and the inorganic particles generate defects, thereby making it difficult to produce high quality nanoporous films comprised of organic-inorganic hybrid materials. Moreover, since it is not easy to uniformly disperse the inorganic particles in the polymer matrix, there is a restriction in forming a plurality of nanoscale pores and an inner structure in which the pores are connected to each other through a three-dimensional fine network.

BRIEF SUMMARY

The present invention has been conceived to solve the problems in the art and embodiments of the present invention provide a method of preparing a nanoporous organic-inorganic hybrid film having a three-dimensional microstructure and a nanoporous separator using the nanoporous organic-inorganic hybrid film.

One aspect of the present invention provides a method of preparing a nanoporous organic-inorganic hybrid film, including: preparing an organic sol including a compound having amino groups, a compound having isocyanate groups, and a solvent; adding an inorganic oxide precursor to the organic sol to form a mixed solution; and subjecting the mixed solution to heat treatment to form an organic molecule network structure in which the organic sol is gelled, and an inorganic molecule network structure located along a surface of the organic molecule network structure.

By heat treatment, the organic sol in which part of the amino groups in the compound having amino groups is bonded to part of the isocyanate groups in the compound having isocyanate groups may be gelled to form an organic molecule network structure having a three-dimensional nanoporous microstructure.

The inorganic oxide precursor may include an alkoxy group, and the amino groups in the organic molecule network structure may be bonded to the alkoxy group in the inorganic oxide precursor by heat treatment to form the inorganic molecule network structure.

The inorganic oxide precursor may include at least one selected from the group consisting of silicon alkoxide and alkoxides of metals including chromium (Cr), vanadium (V), iron (Fe), nickel (Ni), cobalt (Co), copper (Cu), titanium (Ti), zirconium (Zr), manganese (Mn), yttrium (Y), cerium (Ce), and lanthanum (La).

A pore volume of the nanoporous organic-inorganic hybrid film may be controlled by adjusting the content of the inorganic oxide precursor added to the mixed solution.

The inorganic oxide precursor may be added in an amount of 10% by weight (wt %) to 90 wt % relative to the amount of the organic sol. The inorganic oxide precursor may be prepared from a material having a higher boiling point than the solvent for the organic sol.

The method may further include applying the mixed solution to a substrate before heat treatment of the mixed solution.

Heat treatment of the mixed solution may be performed at a temperature of 50° C. to 200° C.

Another aspect of the present invention provides a nanoporous organic-inorganic hybrid film including: an organic molecule network structure having a three-dimensional nanoporous microstructure; and an inorganic molecule network structure having a three-dimensional nanoporous microstructure and located along inner and outer surfaces of the organic molecule network structure.

The nanoporous organic-inorganic hybrid film may have a pore diameter of 1 nm to 100 nm and a specific surface area of 1 $m^2/g$ to 300 $m^2/g$.

A further aspect of the present invention provides a nanoporous separator using the nanoporous organic-inorganic hybrid film.

The nanoporous separator may have a water permeability of 10 $L/m^2$ h to 2000 $L/m^2$ h.

The nanoporous separator may be used to remove a solute having a size of 5 nm or more.

The present invention facilitates the preparation of a nanoporous organic-inorganic hybrid film having a three-dimensional microstructure through simple preparation processes of gelation of an organic sol and condensation of an inorganic oxide precursor.

In addition, the nanoporous separator using the nanoporous organic-inorganic hybrid film having a wide specific surface area can have high water permeability and a high solute rejection rate.

The present invention is not limited to specific effects as mentioned above, and a person having ordinary knowledge in the art could clearly understand other advantageous effects from the following description.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Figure 1:
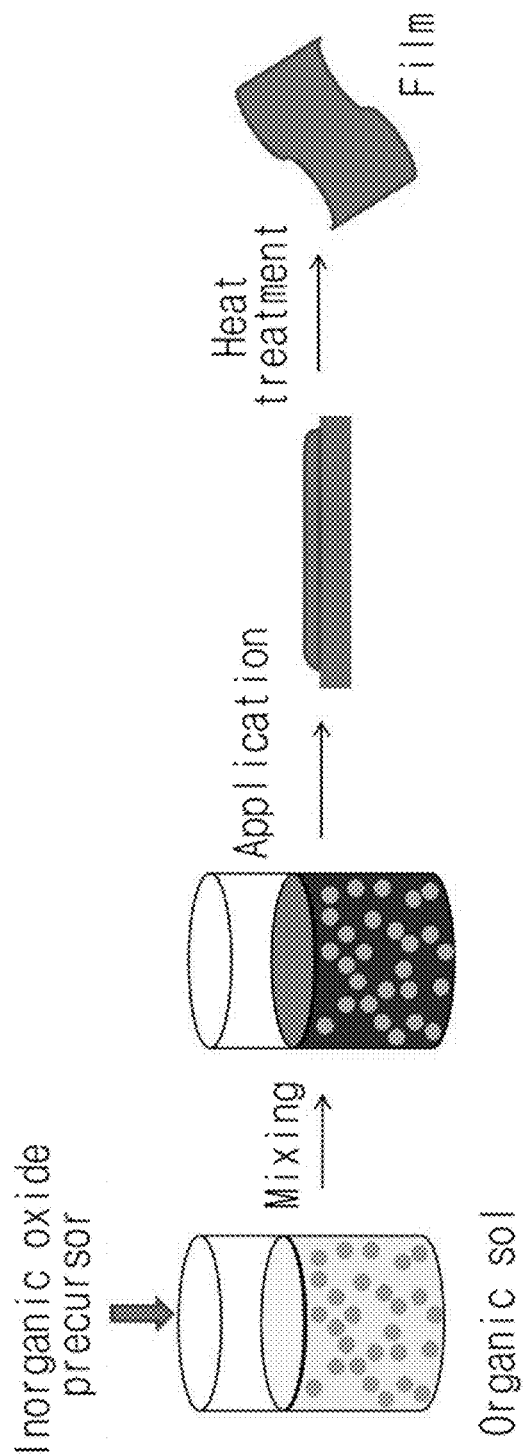
FIG. 1 is a schematic diagram of a method of preparing a nanoporous organic-inorganic hybrid film according to one embodiment of the present invention.

Hereinafter, various embodiments of the present invention will be described in detail in reference to the accompanying drawings.

The present invention can be modified and varied in various ways, and some specific embodiments are provided for illustration in the drawings and will be described in detail below. However, it should be understood that the present invention is not limited to specific embodiments and that various modifications can be made by those skilled in the art without departing from the scope of the present invention defined by the appended claims and equivalents thereof.

It should be understood that the drawings are not to precise scale and may be exaggerated or scaled down in thickness of layers and regions for clarity. Like components will be denoted by like reference numerals throughout the specification.

One aspect of the present invention provides a method of preparing a nanoporous organic-inorganic hybrid film. Specifically, the method of preparing a nanoporous organic-inorgnaic hybrid film includes: 1) preparing an organic sol including a compound having amino groups, a compound having isocyanate groups, and a solvent; 2) adding an inorganic oxide precursor to the organic sol to form a mixed solution; and 3) subjecting the mixed solution to heat treatment to form an organic molecule network structure in which the organic sol is gelled, and an inorganic molecule network structure located along a surface of the organic molecule network structure.

In step 1), an organic sol including a compound having amino groups, a compound having isocyanate groups, and a solvent is prepared.

The compound having amino groups may have at least two amino groups. The compound having amino groups may include, for example, a C1 to C20 aliphatic compound substituted with two to four amino groups, or a C6 to C30 aromatic compound substituted with two to four amino groups.

The compound having isocyanate groups may have at least two isocyanate groups. The compound having isocyanate groups may include, for example, a C1 to C20 aliphatic compound substituted with two to four isocyanate groups, or a C6 to C30 aromatic compound substituted with two to four isocyanate groups.

When the compound having amino groups and the compound having isocyanate groups are mixed, part of the amino groups and part of the isocyanate groups of the respective compounds may be reacted, causing polymerization. Due to polymerization of the compound having amino groups and the compound having isocyanate groups, an organic polymer may be formed in the organic sol. Therefore, the organic sol may include the solvent and the organic polymer formed by polymerization of the compound having amino groups and the compound having isocyanate groups. The organic polymer may include, for example, urea having a porous structure.

The step of preparing the organic sol by mixing the compound having amino groups, the compound having isocyanate groups, and the solvent may be performed by stirring the components at room temperature under a nitrogen atmosphere for 48 hours to 72 hours.

The solvent allows the organic polymer formed through reaction between the compound having amino groups and the compound having isocyanate groups to retain a stabilized sol state in the organic sol. In some embodiments, polar aprotic solvents may be used. Specifically, the solvent may include at least one selected from among dimethylformamide (DMF), dimethyl sulfoxide (DMSO), dimethyl acetamide (DMAc), and N-methylpyrrolidone (NMP).

In step 2), an inorganic oxide precursor is added to the organic sol to form a mixed solution. Namely, the mixed solution may include the organic sol, which includes the compound having amino groups, the compound having isocyanate groups and the solvent, and the inorganic oxide precursor.

The inorganic oxide precursor may include an alkoxy group. Namely, the mixed solution may include the organic sol to which the inorganic oxide precursor having an alkoxy group is added. Specifically, the inorganic oxide precursor having an alkoxy group may include at least one compound selected from among silicon alkoxide, and alkoxides of metals, such as chromium (Cr), vanadium (V), iron (Fe), nickel (Ni), cobalt (Co), copper (Cu), titanium (Ti), zirconium (Zr), manganese (Mn), yttrium (Y), cerium (Ce), lanthanum (La), and the like. Since the inorganic oxide precursor having an alkoxy group may employ the silicon alkoxide compound or the metal alkoxide compound known in the art, the silicon alkoxide compounds and the metal alkoxide compounds are not particularly limited.

In one embodiment, the silicon alkoxide compound may be used as the inorganic oxide precursor having an alkoxy group. For example, the silicon alkoxide compound may include at least one selected from among dimethyldimethoxysilane, diethyldimethoxysilane, methylethyldimethoxysilane, diphenyldimethoxysilane, phenylmethyldimethoxysilane, methyltrimethoxysilane, ethyltrimethoxysilane, propyltrimethoxysilane, phenyltrimethoxysilane, γ-glycidoxypropyltrimethoxysilane, γ-methacryloylpropyltrimethoxysilane, γ-(2-aminoethyl)aminopropyltrimethoxysilane, methyltriethoxysilane, phenyltriethoxysilane, tetramethoxysilane, tetramethoxysilane, tetra(2-ethanol)-orthosilicate, tetra(n-propoxy)silane, tetra(isopropoxy)silane, bis-triethoxysilylethane, and bis-triethoxysilyloctane, without being limited thereto.

In another embodiment, a titanium alkoxide compound may be used as the inorganic oxide precursor having an alkoxy group. For example, the titanium alkoxide compounds may include at least one selected from among titanium methoxide, titanium ethoxide, titanium propoxide, titanium isopropoxide, titanium butoxide, and titanium pentoxide, without being limited thereto.

A pore volume of the nanoporous organic-inorganic hybrid film may be controlled by adjusting the content of the inorganic oxide precursor added to the mixed solution. The degree of binding allowing reaction between the organic sol in the mixed solution and the inorganic oxide precursor may differ depending upon the kind of inorganic oxide precursor, which can cause change of an organic molecule network structure and an inorganic molecule network structure to be formed by heat treatment of the mixed solution. As a result, the pore size and pore volume of the nanoporous organic-inorganic hybrid film can be varied. Therefore, the method according to the present invention allows easy control of the pore volume of the nanoporous organic-inorganic hybrid film through adjustment of the content of the inorganic oxide precursor.

The inorganic oxide precursor may be added in an amount of 10 wt/vol % to 90 wt/vol % relative to the amount of the organic sol. When the content of the inorganic oxide precursor is less than 10 wt/vol %, microphase separation between the organic sol and the inorganic precursor does not occur, whereby the organic sol can collapse, thereby making it difficult to form a three-dimensional nanoporous microstructure. When the content of the inorganic oxide precursor is greater than 90 wt/vol %, phase separation between the organic sol and the inorganic oxide precursors occurs rapidly, whereby the organic sol can form a large aggregated structure, thereby making it difficult to control the microstructure of the organic molecule network structure. The content of the inorganic oxide precursor added to the mixed solution may be adjusted according to the kind of inorganic oxide precursor.

In one embodiment, when the silicon alkoxide compound is added in an amount of 50 wt/vol % to 80 wt/vol % relative to the amount of the organic sol in the mixed solution, it is possible to form a nanoporous organic-inorganic hybrid film having an optimal three-dimensional microstructure. In this way, by appropriately adjusting the amount of the inorganic oxide precursors added depending upon the kind of alkoxide compound used as the inorganic oxide precursor within the range of 10 wt % to 90 wt %, it is possible to form a nanoporous organic-inorganic hybrid film having an optimal three-dimensional microstructure.

The inorganic oxide precursor may be added to the mixed solution within the above range. The nanoporous organic-inorganic hybrid film obtained after heat treatment retains 1% to 50% of the inorganic oxide precursors. This is because the amount of the inorganic oxides becomes less than that of an initial amount thereof due to volatilization of the inorganic oxide precursor not reacting with the organic sol in the mixed solution during heat treatment.

The inorganic oxide precursor may have a higher boiling point than the solvent for the organic sol. Specifically, this condition prevents the inorganic oxide precursor from being removed when the solvent included in the mixed solution is removed by heat treatment for the mixed solution described below. The kind of inorganic oxide precursor may be varied depending upon the kind of solvent. Likewise, since the solvent is required to have a lower boiling point than a material used as the inorganic oxide precursor, the kind of solvent may be varied depending upon the kind of inorganic oxide precursor.

More specifically, for example, when dimethylformamide (DMF) is used as the solvent, materials having a higher boiling point than 150° C. may be used as the inorganic oxide precursor, since dimethylformamide has a boiling point of about 150° C. For example, when the silicon alkoxide compound is used as the inorganic oxide precursor, bis(triethoxysilyl) ethane, bis(triethoxysilyl)octane, and the like may be used as the silicon alkoxide compound having a higher boiling point than 150° C., without being limited thereto.

Prior to heat treatment of the mixed solution in step 3) described below, the method may further include applying the mixed solution to a substrate.

The mixed solution may be applied to a substrate to form a film having a certain thickness. Since the mixed solution may have viscosity, the mixed solution may be applied to the substrate to form a nanoporous organic-inorganic hybrid film having a certain thickness before gelation of the organic sol in the mixed solution. The mixed solution may be applied to the substrate to a thickness of 5 μm to 50 μm. However, it should be noted that the thickness of the mixed solution may be varied as needed. Any method capable of applying the mixed solution to the substrate known in the art may be used. For example, the application method may include bar coating, dip coating, spin coating, cast coating, and the like.

In step 3), the mixed solution is subjected to heat treatment to form an organic molecule network structure in which the organic sol is gelled, and an inorganic molecule network structure located along a surface of the organic molecule network structure.

As the mixed solution is subjected to heat treatment, the solvent included in the mixed solution can be volatilized. Since the mixed solution is a mixture of the organic sol including the compound having amino groups, the compound having isocyanate groups and the solvent, and the inorganic oxide precursor having an alkoxy group, phase separation between the organic sol in the mixed solution and the inorganic oxide precursor can occur as the solvent for the mixed solution is volatilized by heat treatment. After microphase separation between the organic sol and the inorganic oxide precursor, the amino groups and the isocyanate groups located on the surface of the organic sol in an organic sol-rich phase are reacted and further aggregated, thereby forming an organic polymer. The organic polymers formed by polymerization of the amino group and isocyanate groups are connected to each other, thereby allowing gelation of the organic sol. Namely, upon heat treatment, microphase separation occurs in the mixed solution comprised of the organic sol and the inorganic oxide precursor, and the organic polymers in which amino groups and isocyanate groups are polymerized are connected to each other by percolation to form a three-dimensional microstructure through gelation of the organic sol. In other words, the organic molecule network structure having a three-dimensional microstructure is formed through gelation of as the organic sol in which part of amino groups of the compound having amino groups and part of isocyanate groups of the compound having isocyanate groups are bound.

Percolation and further polymerization (or cross-linking reaction) of the respective compounds may occur stepwise or simultaneously. As the solvent included in the mixed solution is further volatized, the concentrations of the organic sol and the inorganic oxide precursor increases, thereby promoting microphase separation between the organic sol and the inorganic oxide precursor and gelation of the organic sol.

In addition, the organic molecule network structure formed by heat treatment may include part of the amino groups and part of the isocyanate groups that do not participate in binding.

As mentioned above, while the organic molecule network structure is generated by heat treatment of the mixed solution, condensation of the inorganic oxide precursor may occur by continued heat treatment at an interface of the inorganic oxide precursor and the organic molecule network structure in the mixed solution. Specifically, the mixed solution is formed by adding the inorganic oxide precursor having an alkoxy group to the organic sol. By heat treatment, the amino groups included in the organic molecule network structure are bonded to the alkoxy group of the inorganic oxide precursor to form the inorganic molecule network structure along the surface of the organic molecule network structure. The inorganic molecule network structure may be formed to surround the overall surfaces (inner and outer surfaces) of the organic molecule network structure.

Since the organic molecule network structure has a three-dimensional nanoporous microstructure, the inorganic molecule network structure located along the inner and outer surfaces of the organic molecule network structure may also have a three-dimensional nanoporous microstructure. As a result, it is possible to prepare a nanoporous organic-inorganic hybrid film that has an organic molecule network structure having a three-dimensional nanoporous microstructure and an inorganic molecule network structure having a three-dimensional nanoporous microstructure along the surface of the organic molecule network structure.

In step 3), heat treatment of the mixed solution may be performed at a temperature of 50° C. to 200° C. Heat treatment is performed to facilitate removal of by-products generated upon condensation of the solvent included in the mixed solution and the inorganic oxide precursor, and unreacted inorganic oxide precursors. Heat treatment may be performed for about 1 hour to 3 hours. The reaction rate may be varied depending upon the kind of inorganic oxide precursor, and is not particularly limited.

FIG. 1 shows a schematic view of a method of preparing a nanoporous organic-inorganic hybrid film according to one embodiment of the present invention.

Referring to FIG. 1, first, an inorganic oxide precursor is added to a reactor provided with an organic sol including a compound having amino groups, a compound having isocyanate groups, and a solvent. In order to prepare a film having a certain thickness, a mixed solution in which the organic sol and the inorganic oxide precursor are mixed is uniformly applied to a substrate. The substrate to which the mixed solution is applied is subjected to heat treatment at 50° C. to 200° C. to prepare a nanoporous organic-inorganic hybrid film.

FIGS. 2a to 2d show a process for forming a nanoporous organic-inorganic hybrid film through heat treatment of a mixed solution applied to a substrate in FIG. 1.

Figure 2A:
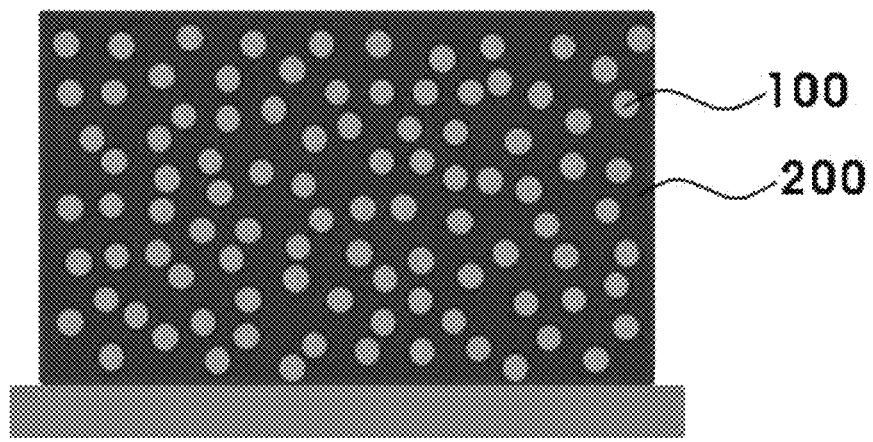
FIGS. 2a to 2d show a process for forming a nanoporous organic-inorganic hybrid film through heat treatment of a mixed solution applied to a substrate in FIG. 1.
Figure 2B:
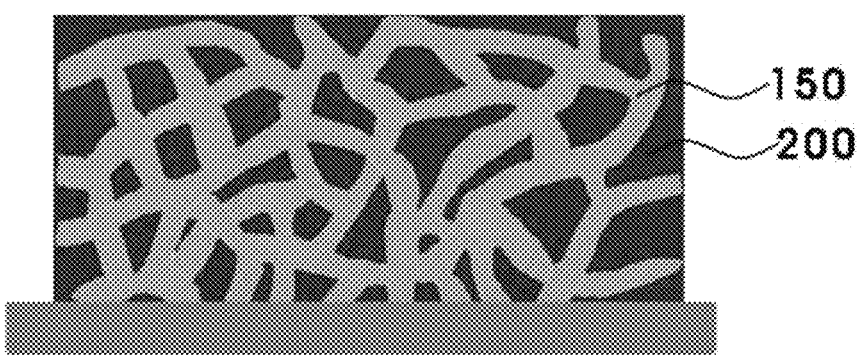
Figure 2C:
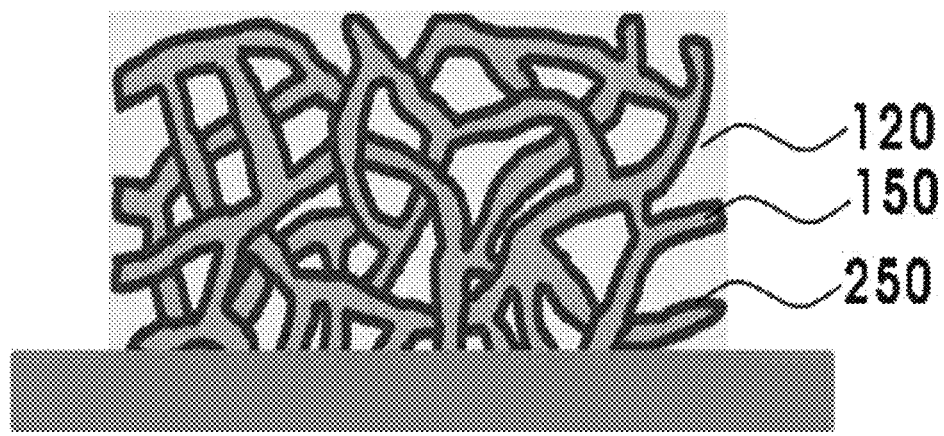
Figure 2D:
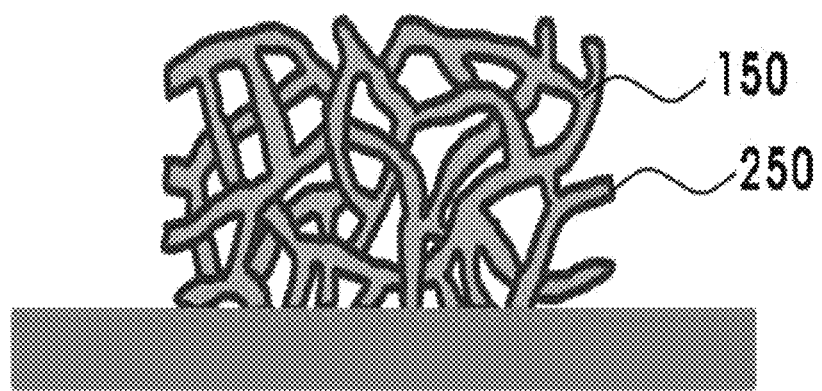

FIG. 2a shows a substrate to which the mixed solution prepared by adding the inorganic oxide precursor 200 to the organic sol 100 including the compound having amino groups, the compound having isocyanate groups and the solvent is applied. Upon heat treatment of the substrate, phase separation between the organic sol in the mixed solution and the inorganic oxide precursor occurs through volatilization of the solvent, as shown in FIG. 2b. Further, gelation of the organic sol occurs, thereby forming an organic molecule network structure 150. By continued heat treatment, condensation of the inorganic oxide precursor may occur at an interface between the organic molecule network structure in the mixed solution and the inorganic oxide precursor included in the mixed solution, thereby causing formation of an inorganic molecule network structure 250 located along surfaces of the organic molecule network structure 150, as shown in FIG. 2c. Part of the solvent 120 may remain on the substrate. By continued heat treatment, all of the solvent remaining on the substrate is removed, thereby forming a nanoporous organic-inorganic hybrid film including the organic molecule network structure 150 and the inorganic molecule network structure 250 on the substrate, as shown in FIG. 2d. The nanoporous organic-inorganic hybrid film may have a three-dimensional microstructure in which plural nanopores 300 are formed.

As described above, by the method of preparing a nanoporous organic-inorganic hybrid film according to the present invention, it is possible to prepare a nanoporous organic-inorganic hybrid film comprised of an organic molecule network structure having a three-dimensional nanoporous microstructure and an inorganic molecule network structure having a three-dimensional nanoporous microstructure through gelation of the organic sol and condensation of the inorganic oxide precursor. A typical method of preparing a nanoporous organic-inorganic hybrid film has problems that it is difficult to achieve uniform dispersion of the inorganic particles in the organic matrix and it is difficult for the inorganic particles to form the inorganic molecule network structure having a three-dimensional space structure. The present invention overcomes such problems.

Namely, the method of preparing a nanoporous organic-inorganic hybrid film according to the invention can easily form the organic molecule network structure having nanoporosity and the inorganic molecule network structure having a three-dimensional nanoporous microstructure, in which the inorganic oxide precursor particles surrounding the surface of the organic molecule network structure are uniformly dispersed, using, as a template, the organic sol capable of forming the aggregated structure, in which pores are connected to each other three-dimensionally and minutely, through a simple process.

Another aspect of the present invention provides a nanoporous organic-inorganic hybrid film. The nanoporous organic-inorganic hybrid film may be prepared by the method of preparing a nanoporous organic-inorganic hybrid film as described above. Specifically, the nanoporous organic-inorganic hybrid film may include an organic molecule network structure having a three-dimensional nanoporous microstructure, and an inorganic molecule network structure having a three-dimensional nanoporous microstructure located on inner and outer surfaces of the organic molecule network structure.

Since the nanoporous organic-inorganic hybrid film is prepared by the preparation method as described in the preparation of the nanoporous organic-inorganic hybrid film, the same description as that of the nanoporous organic-inorganic hybrid film can be applied to the organic molecule network structure and the inorganic molecule network structure. The description of the method of preparing a nanoporous organic-inorganic hybrid film can be applied to preparation of the nanoporous organic-inorganic hybrid film according to the present invention, and thus a detailed description of the preparation of the nanoporous organic-inorganic hybrid film is omitted herein. Hereinafter, characteristic features of the nanoporous organic-inorganic hybrid film are described.

The nanoporous organic-inorganic hybrid film has a structure in which the inorganic molecule network structure surrounds the organic molecule network structure and has properties of both an organic material and an inorganic material. The nanoporous organic-inorganic hybrid film has not only chemically and thermally good stability but also high processability and flexibility, and thus can be utilized as various materials.

Specifically, the nanoporous organic-inorganic hybrid film has a pore diameter of 1 nm to 100 nm and a specific surface area of 1 $m^2/g$ to 300 $m^2/g$. The pore diameter and specific surface area of the nanoporous organic-inorganic hybrid film may be adjusted depending upon the kind and content of inorganic oxide precursor added in preparation of the nanoporous organic-inorganic hybrid film. Porosity of the nanoporous organic-inorganic hybrid film will be illustrated in Examples below and the accompanying drawings. However, the present invention is not limited thereto.

A further aspect of the present invention provides a nanoporous separator using the nanoporous organic-inorganic hybrid film. Since the nanoporous separator employs the nanoporous organic-inorganic hybrid film, the same description as that of the nanoporous organic-inorganic hybrid film can be applied to the organic molecule network structure employed in the nanoporous separator and the inorganic molecule network structure. The detailed description of the nanoporous organic-inorganic hybrid film can be applied to the nanoporous separator of the present invention, and thus a detailed description of the nanoporous separator is omitted herein.

The nanoporous separator may be a membrane capable of permeating or removing specific materials through many pores having various nanoscale pore diameters and a wide specific surface area by utilizing structural properties of the nanoporous organic-inorganic hybrid film having a three-dimensional microstructure. Such nanoporous separator may have high permeability or improved selective rejection rate for solutes having specific size and thus can be utilized in various fields.

Specifically, the nanoporous separator may have a water permeability of 10 $L/m^2$ h to 2000 $L/m^2$ h. In addition, the nanoporous separator can reject solutes having a size of 5 nm or more. The separation selectivity and water permeability of the nanoporous separator may be controlled by the kind and content of inorganic oxide precursor added for the preparation of the nanoporous organic-inorganic hybrid film. Separation selectivity and water permeability of the nanoporous separator will be described in detail in the following examples and the accompanying drawings.

EXAMPLE

Example 1-1: Preparation of Organic Sol

Tetra(4-aminophenyl)methane (MW: 382.50) as a compound having amino groups was dissolved to a concentration of 4 wt/vol % in N,N-dimethylformamide as a solvent. In addition, 1,4-diisocyanatohexane (MW: 168.19) as a compound having isocyanate groups was dissolved to a concentration was 4 wt/vol % in N,N-dimethylformamide as a solvent. The resulting solutions were mixed and stirred at room temperature for about 72 hours to prepare an organic sol.

Example 1-2: Preparation of Nanoporous Organic-Inorganic Hybrid Film by Adding Inorganic Oxide Precursor to Organic Sol Bis(triethoxysilyl)ethane (BTESE) as an inorganic oxide precursor was added to the organic sol of Example 1-1. BTESE was added to the organic sol such that the concentration was 30 wt/vol %, 50 wt/vol %, 60 wt/vol %, 70 wt/vol %, and 90 wt/vol %. Five mixed solutions prepared by changing the content of the inorganic oxide precursor were stirred for about 1 hour. Each of the mixed solutions was applied to a glass substrate by casting, followed by heat treatment at 50° C. for 1 hour, 100° C. for 1 hour, 200° C. for 1 hour, thereby finally preparing nanoporous organic-inorganic hybrid films.

Figure 3:
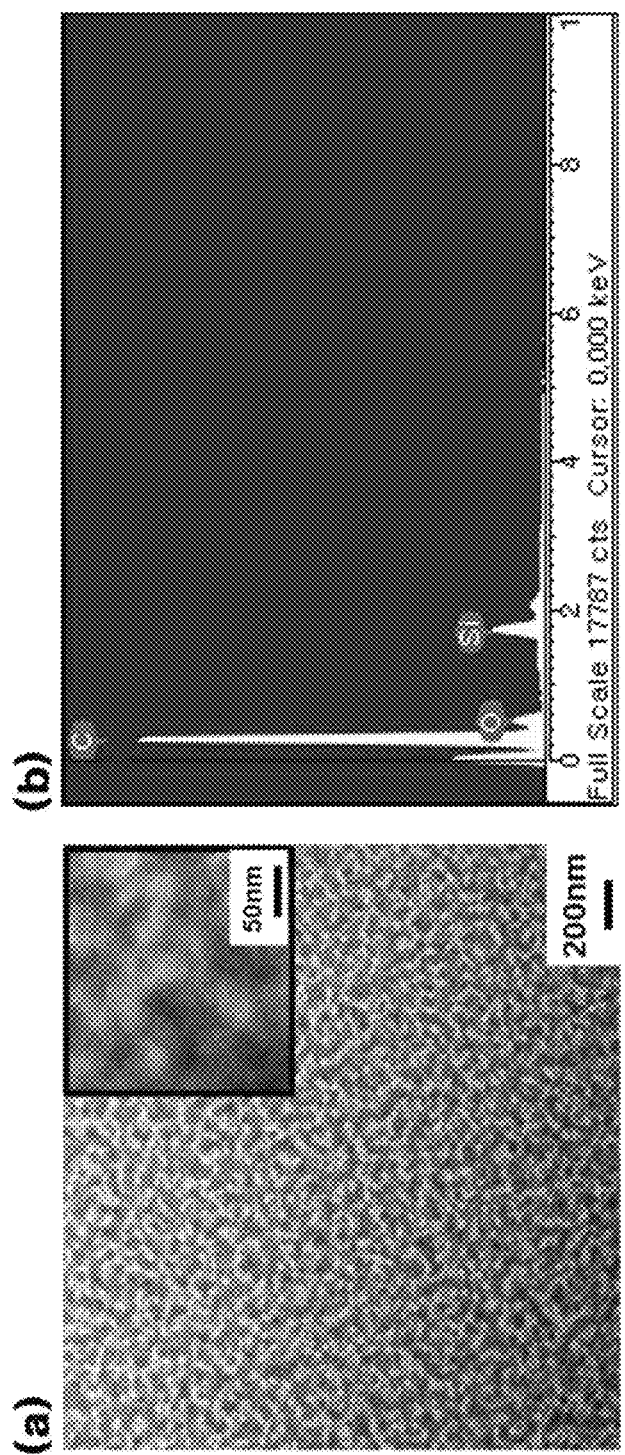
FIG. 3 shows TEM images and EDS analysis results of nanoporous organic-inorganic hybrid films prepared in Example 1.

FIG. 3 shows TEM images and EDS analysis results of the nanoporous organic-inorganic hybrid films prepared in Example 1.

FIG. 3a shows a TEM image of the nanoporous organic-inorganic hybrid film prepared in Example 1 in which silane (BTESE) as the inorganic oxide precursor was added in an amount of 70 wt/vol %. From the image, it can be seen that there are a number of nanopores at a cross-section of the nanoporous organic-inorganic hybrid film and the pores are minutely connected to form a three-dimensional structure. Further, FIG. 3b shows an energy dispersive spectroscopy (EDS) analysis, from which it is seen that organic materials (carbon and oxygen) and inorganic materials (Si) are detected together. It can be seen from the above that the nanoporous organic-inorganic hybrid films prepared in Example are comprised of a hybrid of organic materials and inorganic materials.

Figure 4:
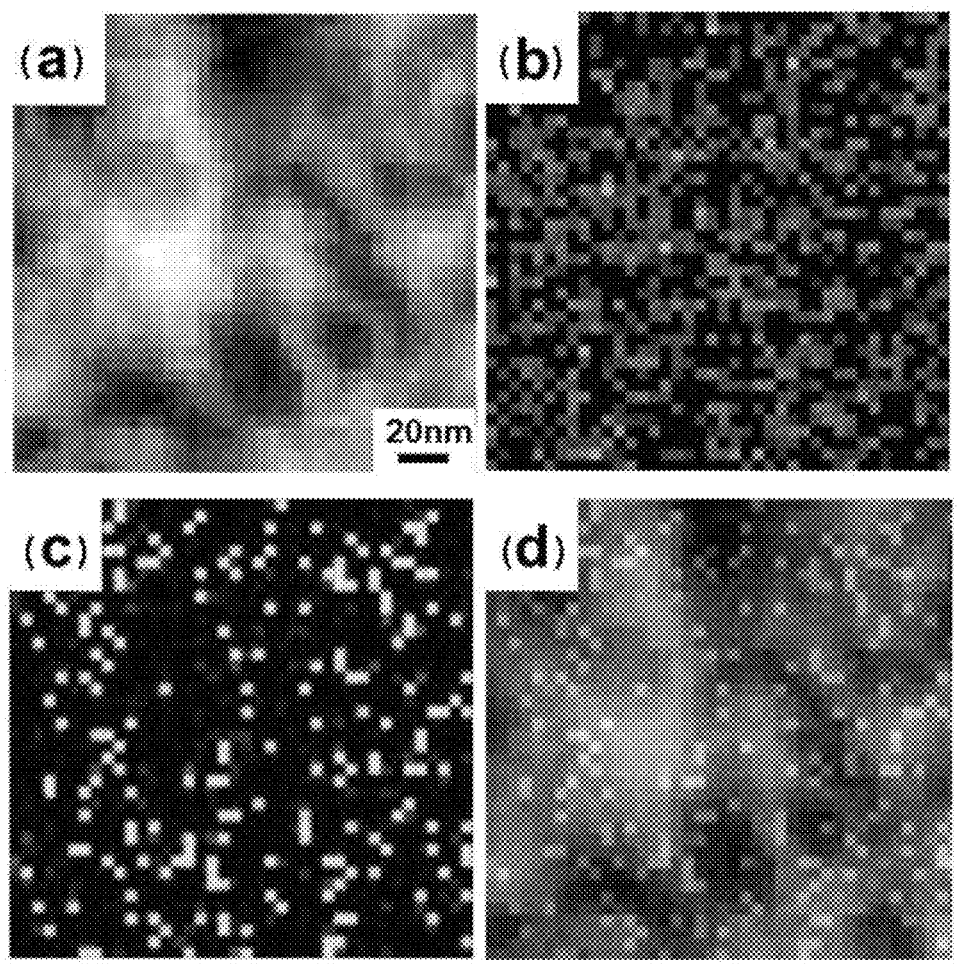
FIG. 4 shows SEM images and element mapping results for silicon (Si) and nitrogen (N) of the nanoporous organic-inorganic hybrid films prepared in Example 1 in which the inorganic oxide precursor was added in an amount of 70 wt/vol %.

FIG. 4 shows SEM images and element mapping results for silicon (Si) and nitrogen (N) of the nanoporous organic-inorganic hybrid films according to Example 1 in which the inorganic oxide precursor is added in an amount of 70 wt/vol %.

FIG. 4a shows an SEM image of the nanoporous organic-inorganic hybrid film prepared in Example 1 before performing element mapping for Si and N. From this image, it can be seen the nanoporous organic-inorganic hybrid films of Example 1 are divided into bright sections and dark sections. FIG. 4b shows a high magnification nitrogen (N) element mapping image of the nanoporous organic-inorganic hybrid film of Example 1. From this image, it can be seen that a large amount of nitrogen (N) elements contained in the organic sol used in preparation of the nanoporous organic-inorganic hybrid film of the present invention is present in the brightest section of the image. FIG. 4c shows a high magnification silicon (Si) element mapping image of the nanoporous organic-inorganic hybrid film of Example 1. From this image, it can be seen that silicon (Si) elements contained in the organic sol used in the nanoporous organic-inorganic hybrid films of the present invention are densely present outside the brightest section of the image. It can be contemplated that silicon (Si) originates from silane (BTESE) added as the inorganic oxide precursor. FIG. 4d shows an image formed by overlapping the images of FIG. 4a and FIG. 4c. From the image, it can be seen that silicon (Si) is dispersed in the dark section of FIG. 4(a).

It could be seen that the nanoporous organic-inorganic hybrid film of the present invention has a structure in which the surface of the organic molecule network structure including nitrogen (N) is surrounded by silicon (Si) of silane (BTESE) used as the inorganic oxide precursor.

Figure 5:
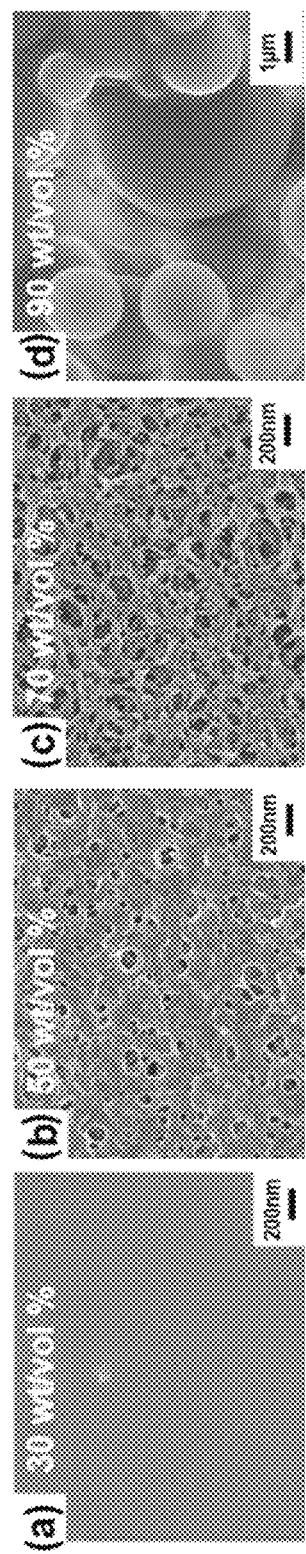
FIG. 5 shows SEM images of the nanoporous organic-inorganic hybrid films prepared in Example 1 depending upon the content of an inorganic oxide precursor.

FIG. 5 shows SEM images of the nanoporous organic-inorganic hybrid films prepared in Example 1 depending upon the content of the inorganic oxide precursor.

In FIG. 5a, in which silane (BTESE) used as the inorganic oxide precursor was added in an amount of 30 wt/vol % to the organic sol, it could be seen that, since the content of silane (BTESE) was not sufficient, the organic-inorganic particles constituting the nanoporous organic-inorganic hybrid film exhibited a condensed structure and thus did not exhibit porosity. In FIG. 5b and FIG. 5c in which silane was added in amounts of 50 wt/vol % and 70 wt/vol %, it could be seen that a porous structure and a three-dimensionally minutely connected molecule network structure were formed. In FIG. 5d in which silane (BTESE) used as the inorganic oxide precursor was added in an amount of 90 wt/vol %, it could be seen that the organic molecule network structure was aggregated to a larger size, and the organic molecule network structure and the inorganic molecule network structure were not sufficiently formed.

As a result, it can be seen that the organic molecule network structure in which the organic sol is gelled can have much improved porosity of the nanoporous organic-inorganic hybrid to provide a three-dimensional nanoporous microstructure when the inorganic oxide precursor is added in an amount of 50 wt/vol % to 70 wt/vol % to the organic sol. This is because, when the organic sol is gelled through volatilization of the solvent in the mixed solution to form the organic molecule network structure, the inorganic oxide precursor added within the above range can function as a non-solvent in the organic sol, whereby microphase separation between the organic sol and the inorganic oxide precursor occurs, thereby causing gelation of the organic sol.

Figure 6:
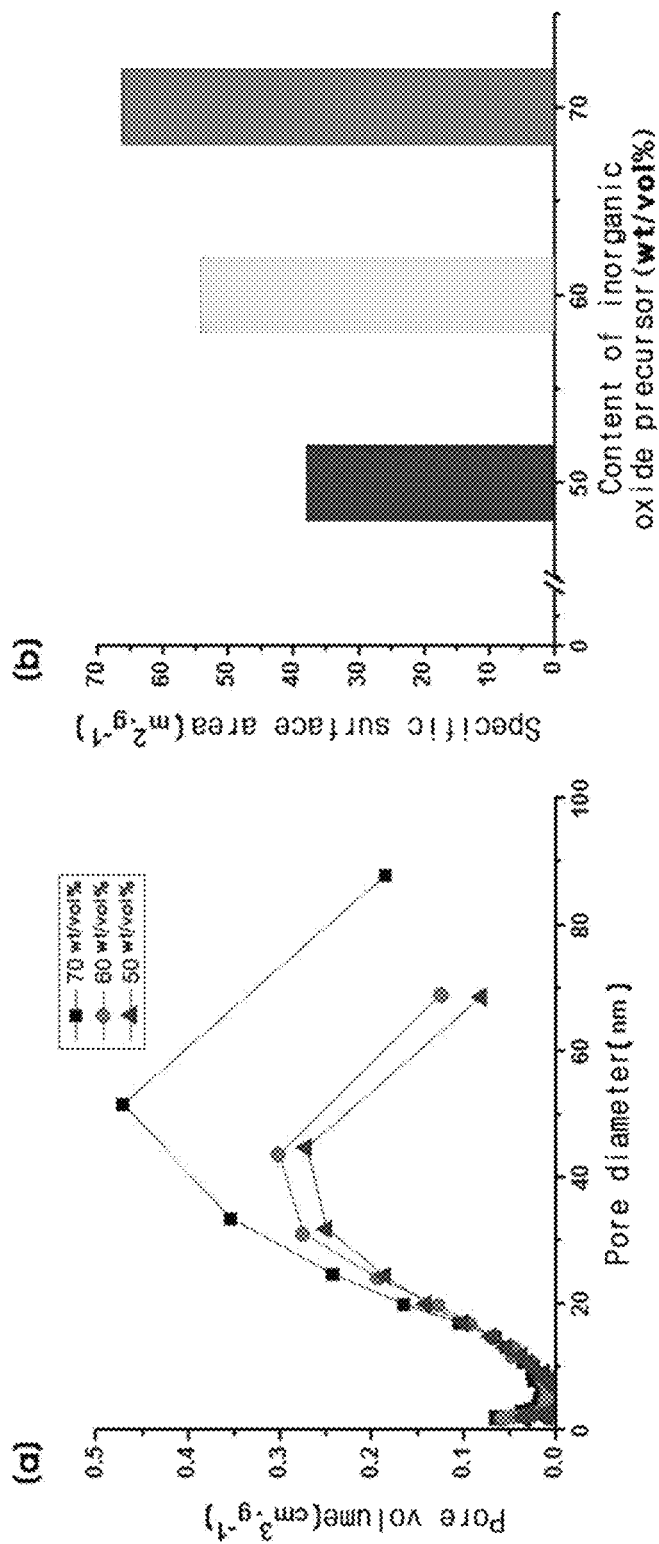
FIG. 6 shows graphs depicting a pore size distribution and a specific surface area of the nanoporous organic-inorganic hybrid film prepared in Example 1 depending upon the pore diameter and the content of an inorganic oxide precursor, respectively.

FIG. 6 shows graphs depicting a pore size distribution and a specific surface area of the nanoporous organic-inorganic hybrid films prepared in Example 1 depending upon the pore diameter and the content of an inorganic oxide precursor, respectively.

Referring to FIG. 6a, the nanoporous organic-inorganic hybrid film according to the present invention has pore distribution having a pore diameter of 1 nm to 100 nm. Pore distribution having a minimum pore diameter may occur regardless of the content of the inorganic oxide precursor. However, as the content of the inorganic oxide precursor relative to the organic sol included in the mixed solution increases from 50 wt/vol % to 70 wt/vol %, the number of larger pores increases. In FIG. 6b, the nanoporous organic-inorganic hybrid film has a specific surface area of 35 $m^2/g$ to 65 $m^2/g$. It can be seen that the specific surface area of the nanoporous organic-inorganic hybrid film increases as the content of the inorganic oxide precursor increases from 50 wt/vol % to 70 wt/vol %. The added amount of silane (BTESE) used as the inorganic oxide precursor increases from 50 wt/vol % to 70 wt/vol %, a pore structure having a nanoscale diameter and a three-dimensional microstructure can be developed, thereby increasing the specific surface area of the nanoporous organic-inorganic hybrid film.

Comparative Example 1: Preparation of Nanoporous Organic Films to Which Inorganic Oxide Precursor was not Added Nanoporous organic films were prepared in the same manner as in Example 1-2 except that the inorganic oxide precursor was not added to the organic sol.

Figure 7:
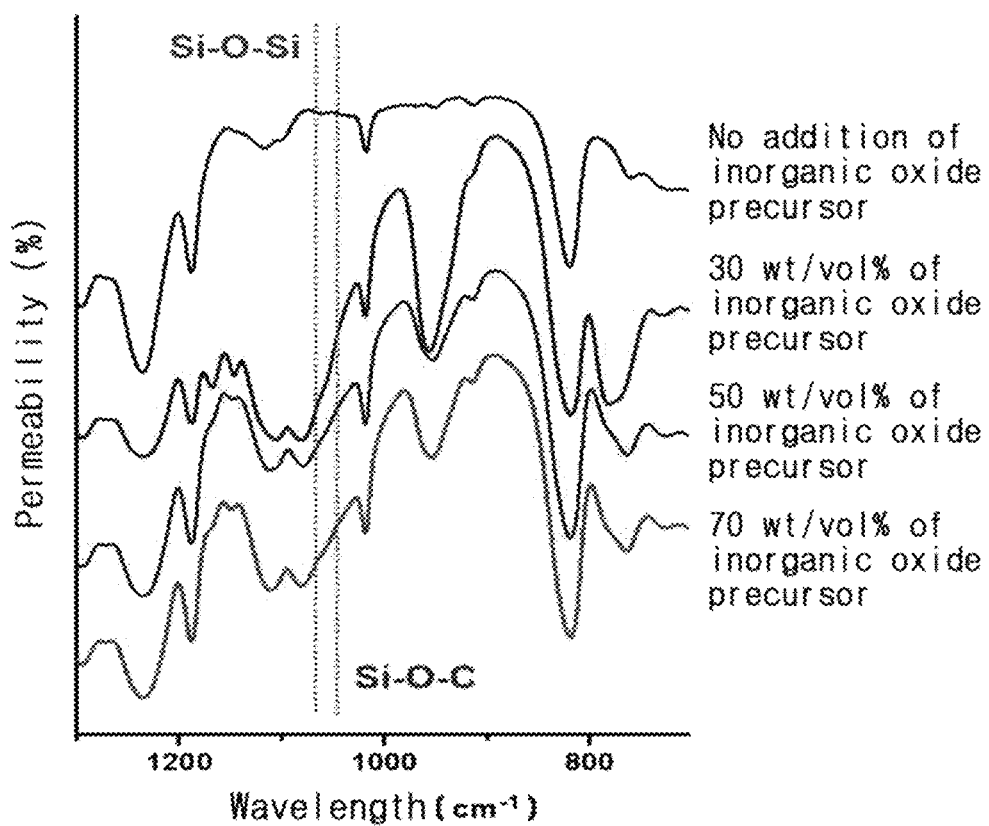
FIG. 7 shows IR analysis results of the nanoporous films prepared in Example 1 and Comparative Example 1.

FIG. 7 show an IR analysis result of the nanoporous films prepared in Example 1 and Comparative Example 1.

Referring to FIG. 7, the nanoporous organic film of Comparative Example 1 to which the inorganic oxide precursor was not added exhibited high permeability in a wavelength range of Si—O—Si. This means that there is almost no Si—O—Si bonding in the structure. On the other hand, it could be seen that the nanoporous organic-inorganic hybrid films of Example 1 to which the inorganic oxide precursor was added had low Si—O—Si permeability as the content of the inorganic oxide precursor increased (30 wt/vol %, 50 wt/vol %, 70 wt/vol %). This means that heat treatment after addition of the inorganic oxide precursor generates Si—O—Si bonds through condensation of the inorganic oxide precursor along the organic molecule network structure.

As described above, in preparation of the nanoporous organic-inorganic hybrid film according to the present invention, the inorganic oxide precursor was added to the organic sol, followed by heat treatment, thereby forming an inorganic molecule network structure, in which the inorganic oxide precursor is cured along the organic molecule network structure, through condensation of the inorganic oxide precursor without separate hydrolysis. Accordingly, the present invention provides a simple process, as compared with a typical method of preparing an organic-inorganic hybrid film using an inorganic sol-gel process requiring hydrolysis of the inorganic oxide precursor and condensation.

Comparative Example 2: Preparation of Nanoporous Organic-Inorganic Hybrid Films Using TMOS as Inorganic Oxide Precursor Nanoporous organic films were prepared in the same manner as in Example 1-2 except that tetramethylorthosilicate (TMOS) was added as an inorganic oxide precursor in an amount of 70 wt/vol % to the organic sol instead of BTESE.

Comparative Example 3: Preparation of Nanoporous Organic-Inorganic Hybrid Films Using TEOS as Inorganic Oxide Precursor Nanoporous organic films were prepared in the same manner as in Example 1-2 except that tetraethylorthosilicate (TEOS) was added as an inorganic oxide precursor in an amount of 70 wt/vol % to the organic sol instead of BTESE.

Example 2: Preparation of Nanoporous Organic-Inorganic Hybrid Films Using BTESO as Inorganic Oxide Precursor Nanoporous organic films were prepared in the same manner as in Example 1-2 except that bis(triethoxysilyl)

octane (BTESO) was added as an inorganic oxide precursor in an amount of 70 wt/vol % to the organic sol instead of BTESE.

Figure 8:
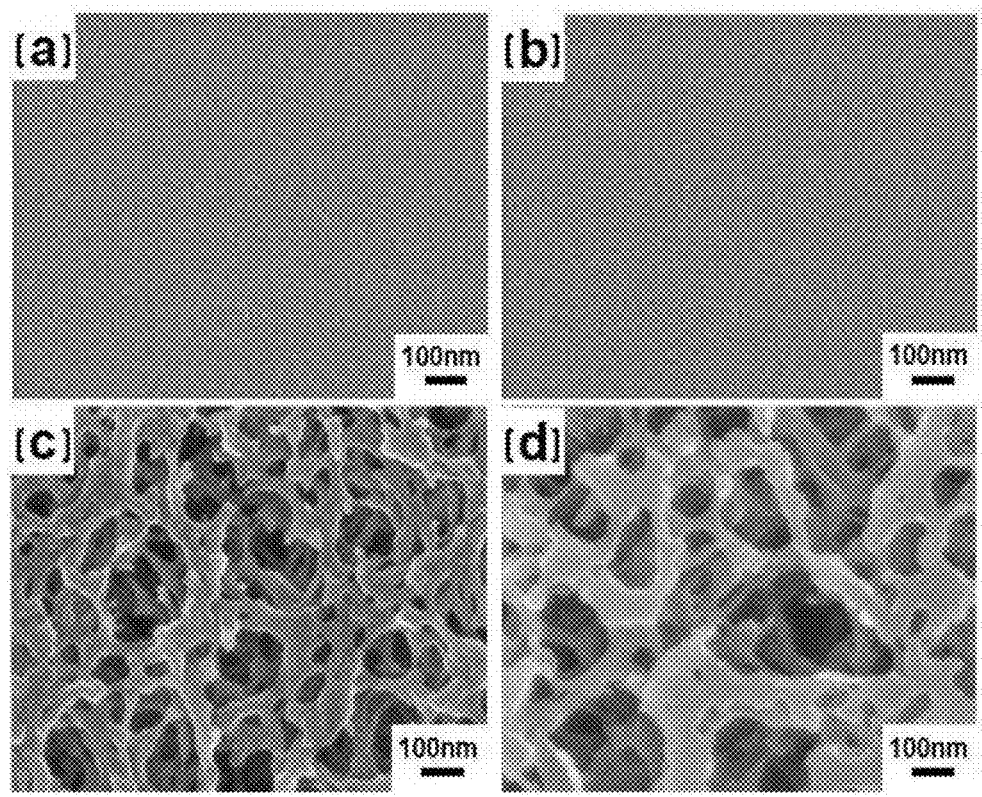
FIG. 8 shows SEM images of the nanoporous organic-inorganic hybrid films prepared in Comparative Examples 2 and 3, and Examples 1 and 2.

FIG. 8 shows SEM images of the nanoporous organic-inorganic hybrid films prepared in Comparative Examples 2 to 3 and Examples 1 and 2.

Referring to FIGS. 8a and 8b, it could be seen that the nanoporous organic-inorganic hybrid films of Comparative Examples 2 to 3 in which TMOS and TEOS were used as the inorganic oxide precursor had closely compacted particles without pores. The boiling point of TMOS and TEOS is lower than or similar to that of dimethylformamide (DMF). For this reason, when the mixed solution of the organic sol and the inorganic oxide precursor was subjected to heat treatment to volatilize the solvent, the inorganic oxide precursor was also volatilized together with the inorganic oxide precursor, thereby forming a condensed organic gel having no pores.

Referring to FIGS. 8c and 8d, when the nanoporous organic-inorganic hybrid films of Examples 1 and 2 in which BTESE and BTESO used as the inorganic oxide precursor having a higher boiling point than DMF used as the solvent were added were subjected to heat treatment to volatilize the solvent, the inorganic oxide precursor was not volatilized, and thus the nanoporous organic-inorganic hybrid film comprised of the organic molecule network structure and the inorganic molecule network structure could be easily formed. It can be seen that the inorganic oxide precursor of the present invention is required to have a higher boiling point than that of the solvent.

Example 3: Preparation of Nanoporous Separators Using Nanoporous Organic-Inorganic Hybrid Films The nanoporous organic-inorganic hybrid films including the organic molecule network structure and the inorganic molecule network structure prepared using silane (BTESE) in amounts of 50 wt/vol %, 60 wt/vol % and 70 wt/vol % as the inorganic oxide precursor in Example 1 were used as separators.

Figure 9:
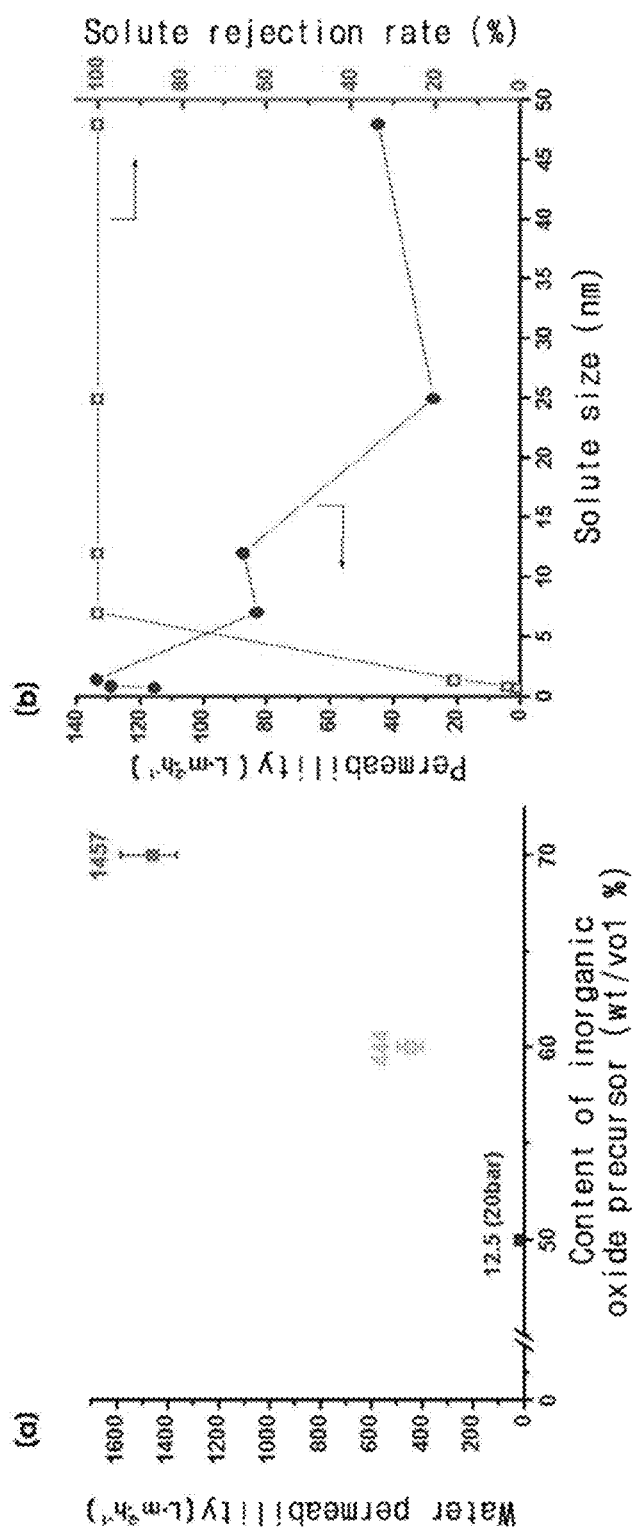
FIG. 9 shows graphs depicting results of water permeability and rejection test (solute clearance test) of the nanoporous separators prepared in Example 3.

FIG. 9 shows graphs depicting results of water permeability and rejection test (solute clearance test) of the nanoporous separators prepared in Example 3.

Referring to FIG. 9a, the nanoporous separators prepared using the nanoporous organic-inorganic hybrid film prepared by adding silane (BTESE) in amounts of 50 wt/vol %, 60 wt/vol % and 70 wt/vol % as the inorganic oxide precursor in Example 1 were evaluated by a dead-end system under a drive pressure of 5 bar. The separator using the nanoporous organic-inorganic hybrid film prepared by adding 70 wt/vol % of silane (BTESE) exhibited the highest water permeability, that is, about 1450 $L \cdot m^{-2} \cdot h^{-1}$.

In addition, when the separator using the nanoporous organic-inorganic hybrid film prepared by adding 70 wt/vol % of silane (BTESE) and exhibiting the highest water permeability was subjected to rejection testing using an aqueous solution containing silica beads having various sizes of 7 nm, 12 nm, 25 nm, and 48 nm, it could be seen that the nanoporous separator could remove silica beads having a size of 7 nm, as depicted in FIG. 9b. As such, the nanoporous separator using the nanoporous organic-inorganic hybrid film according to the present invention can secure high permeability through structural characteristics thereof and can easily reject solutes having a predetermined size.

Although the present invention has been described with reference to some embodiments, it should be understood that the foregoing embodiments are provided for illustration only and are not to be construed in any way as limiting the present invention, and that various modifications, changes, alterations, and equivalent embodiments can be made by those skilled in the art without departing from the spirit and scope of the invention.

LIST OF REFERENCE NUMERALS

100: Organic sol
120: Solvent
150: Organic molecule network structure
200: Inorganic oxide precursor
250: Inorganic molecule network structure
300: Nanopore

What is claimed is:

1. A method of preparing a nanoporous organic-inorganic hybrid film, comprising:
preparing an organic sol comprising a compound having amino groups, a compound having isocyanate groups, and a solvent;
adding an inorganic oxide precursor to the organic sol to form a mixed solution, wherein the inorganic oxide precursor comprises a compound having an alkoxy group; and
subjecting the mixed solution to heat treatment
to form a microphase separation between the organic sol and the inorganic oxide precursor, and
to form an organic-inorganic hybrid network structure comprising:
an organic molecule network structure; and
an inorganic molecule network structure on an inner surface of the organic network structure and on an outer surface of the organic network structure,
wherein the inorganic molecule network structure is formed from the compound having the alkoxy group,
wherein the organic molecule network structure is formed from the compound having amino groups and the compound having isocyanate groups,
wherein the compound having the alkoxy group comprises at least one silicon alkoxide compound selected from the group consisting of bis(triethoxysilyl)ethane (BTESE), and bis(triethoxysilyl)octane (BTESO).

2. The method of preparing a nanoporous organic-inorganic hybrid film according to claim 1, wherein the inorganic molecule network structure and the organic molecule network structure are interconnected via a chemical bond between the compound having amino groups in the organic molecule network structure and the compound having the alkoxy group in the inorganic molecule network structure.

3. The method of preparing a nanoporous organic-inorganic hybrid film according to claim 1, wherein the inorganic oxide precursor comprises at least one selected from silicon alkoxide, and alkoxides of metals including chromium (Cr), vanadium (V), iron (Fe), nickel (Ni), cobalt (Co), copper (Cu), titanium (Ti), zirconium (Zr), manganese (Mn), yttrium (Y), cerium (Ce), and lanthanum (La).

4. The method of preparing a nanoporous organic-inorganic hybrid film according to claim 1, wherein a pore volume of the nanoporous organic-inorganic hybrid film is controlled by adjusting the content of the inorganic oxide precursor added to the mixed solution.

5. The method of preparing a nanoporous organic-inorganic hybrid film according to claim 1, wherein the inorganic oxide precursor is prepared from a material having a boiling point higher than the solvent for the organic sol.

6. The method of preparing a nanoporous organic-inorganic hybrid film according to claim 1, further comprising: applying the mixed solution to a substrate before heat treatment of the mixed solution.

7. The method of preparing a nanoporous organic-inorganic hybrid film according to claim 1, wherein heat treatment of the mixed solution is performed at a temperature of 50° C. to 200° C.

8. A nanoporous organic-inorganic hybrid film prepared by the method according to claim 1, comprising: the organic-inorganic hybrid network structure.

9. The nanoporous organic-inorganic hybrid film according to claim 8, wherein the nanoporous organic-inorganic hybrid film has a pore diameter of 1 nm to 100 nm and a specific surface area of 1 $m^2/g$ to 300 $m^2/g$.

10. A nanoporous separator using the nanoporous organic-inorganic hybrid film according to claim 8.

11. The nanoporous separator according to claim 10, wherein the nanoporous separator has a water permeability of 10 $L/m^2$ h to 2000 $L/m^2$ h.

12. The nanoporous separator according to claim 10, wherein the nanoporous separator is used to reject a solute having a size of 5 nm or more.

13. The method of preparing a nanoporous organic-inorganic hybrid film according to claim 1, wherein the inorganic oxide precursor is added in an amount of 10 wt % to 90 wt % relative to an amount of the organic sol.

14. The method of preparing a nanoporous organic-inorganic hybrid film according to claim 1, wherein the inorganic oxide precursor is added in an amount of 50 wt % to 70 wt % relative to an amount of the organic sol.

15. The method of preparing a nanoporous organic-inorganic hybrid film according to claim 1, wherein the inorganic oxide precursor is added in an amount of 60 wt % to 70 wt % relative to an amount of the organic sol.

16. The nanoporous organic-inorganic hybrid film according to claim 8, wherein the nanoporous organic-inorganic hybrid film has a specific surface area of 35 $m^2/g$ to 65 $m^2/g$.

* * * * *